United States Patent [19]

Forster et al.

[11] 4,360,820
[45] Nov. 23, 1982

[54] LASER RECORDING MEDIUM

[75] Inventors: Alette J. Forster, Sunnyvale; Muriel M. Ockers, San Jose, both of Calif.

[73] Assignee: OMEX, Santa Clara, Calif.

[21] Appl. No.: 80,516

[22] Filed: Oct. 1, 1979

[51] Int. Cl.³ .......................................... G01G 15/34
[52] U.S. Cl. ............................. 346/135.1; 346/76 L; 369/284; 427/255.6; 430/945; 430/961
[58] Field of Search ..................... 346/76 L, 135.1; 430/945, 531, 523, 961; 427/255.6; 369/283, 284

[56] References Cited

U.S. PATENT DOCUMENTS

| | | | |
|---|---|---|---|
| 3,665,483 | 5/1972 | Becker | 346/76 L X |
| 3,696,742 | 10/1972 | Parts | 346/76 L X |
| 3,901,994 | 8/1975 | Mehalso | 427/255.6 X |
| 3,911,444 | 10/1975 | Lou | 346/76 L X |
| 4,037,251 | 7/1977 | Bricot | 369/283 X |
| 4,069,487 | 1/1978 | Kasai | 346/76 L |

Primary Examiner—Joseph W. Hartary
Attorney, Agent, or Firm—Flehr, Hohbach, Test, Albritton & Herbert

[57] ABSTRACT

A laser recording medium in which a metal recording layer is completely encapsulated between an intermediate layer of solvent-based plastic material and a protective layer of polymeric material formed on the recording layer in a vapor deposition process.

4 Claims, 5 Drawing Figures

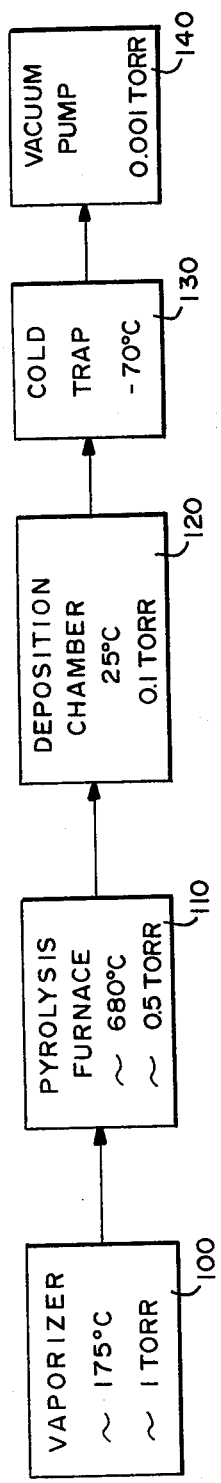
FIG.—4
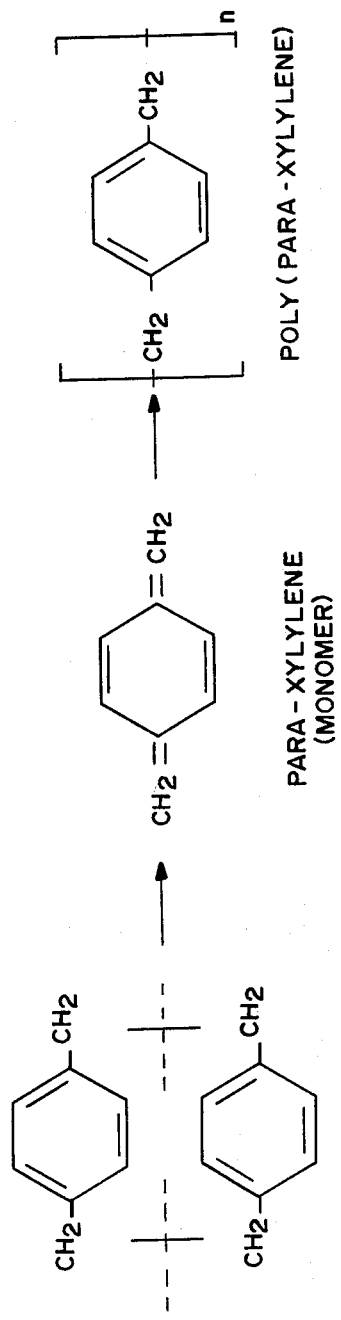
FIG.—5

LASER RECORDING MEDIUM

The U.S. Government has rights in this invention pursuant to Grant C-DAR 78-21344 from the National Science Foundation.

This invention relates generally to binary data information storage systems and, in particular, to a data recording medium responsive to energy from a focused laser beam.

The data processing industry has made rapid strides in providing computers systems and related peripheral equipment for manipulating binary encoded numeric and alphabetic data at faster speeds and storing such data at higher densities and lower costs. Large corporations and government bureaus have placed increasing reliance on data processing equipment in automating data collection, storage and processing to improve the efficiency of handling business transactions, accounting information, etc. Increases in computer operating speeds are largely the result of improvements in semiconductor technology which have produced large scale integrated (LSI) circuits involving higher densities of binary logic elements or gates operating at faster speeds. Substantial increases in memory densities have also been achieved. In the semiconductor memory area, bit density increases have resulted both from improved LSI technology which enables a shrinking of the size of memory cell elements and from new LSI technology such as magnetic bubble domain memories. In the magnetic memory area, density improvements in hard and flexible disc systems have been achieved by improvements in magnetic recording media and reading and writing heads associated therewith.

Despite the substantial increases in semiconductor and magnetic memory system densities, the cost per bit of such storage media together with encoding costs does not justify the use of such technology for storing, on a routine basis, large volumes of traditional business records, such as correspondence, reports, forms, legal documents, etc. The storage and maintenance of both current working files of these documents and archives of selected documents which must be retained securely for long periods of time is still largely a manual operation involving increasingly costly personnel and storage space.

Digital laser recording technology has been developed in recent years to provide high density binary data storage which is readily integratable with both computer data processing equipment and facsimile document scanning and printing apparatus. This technology enables real time optical recording of image data in a highly compressed format and rapid opto-electronic access to recorded image data and can thus provide the basic framework for computer based document storage and retrieval and an overall record management system. At the heart of this technology is a laser beam writing and reading system which is capable of storing binary digital information in the form of the presence or absence of minute holes created in a thin film recording medium as a highly focused, modulated laser beam is scanned across the recording medium.

The basic principles of laser image recording are set forth in Becker U.S. Pat. No. 3,474,457. Becker et al. U.S. Pat. No. 3,654,624 and McFarland et al. U.S. Pat. No. 3,657,707 show a laser recording system utilizing a rotating drum carrying a laser recording medium comprising flexible strips of plastic materials (such as Mylar) with a layer of energy absorbing material thereon. Such a laser recording medium is more fully described in Becker et al. U.S. Pat. No. 3,665,483. However, the use of a rotating drum or other mechanical scanning of the recording medium limits the record scanning speed during both recording and retrieval of data and thus artificially constrains the overall system to data writing and reading speeds substantially less than those dictated by available laser beam energies and recording media sensitivities. In addition, the use of flexible recording media limits the alignment precision which can be reproducibly achieved between data tracks and the laser beam path and, correspondingly, constrains the system to data bit densities substantially lower than the minimum cell size dictated by the system optics. Moreover, flexible recording media are highly subject to contamination by dust particles which may cause data writing and/or reading errors and thus require special handling and storage in dust-free compartments within the system. It is thus apparent that different approaches to scanning the laser beam across the recording medium and different structures for the recording medium itself are required to provide a system that fully utilizes the write/read speed and bit densities of which laser beam recording technology is inherently capable and also simplifies the recording media storage and handling requirements.

Becker et al. U.S. Pat. No. 4,001,840 discloses a laser recording system which utilizes a mirror assembly rotatable on two orthogonal axes to deflect a laser beam in two directions for writing data on a recording layer formed on a rigid glass substrate. This mirror-beam deflection system is capable of achieving faster beam scanning, and the rigid glass substrate supporting the recording layer enables more precise, reproducible alignment between the recording medium and the scanned laser beam. However, it has been found that the use of a layer of recording material directly on a glass substrate results in a laser recording medium of substantially less sensitivity than a corresponding laser recording medium comprising a recording layer formed on a plastic substrate. In addition, the affinity between the metal recording layer and a glass substrate may produce irregularities in the shapes and sizes of holes burned into the recording layer. Use of a glass substrate thus necessitates the forming of a more complex recording medium in order to maintain overall sensitivity of the laser recording system and to achieve high writing speeds with low error rates.

A copending application of Kaczorowski and Shen, Ser. No. 950,066, filed Oct. 10, 1978, discloses the use of a layer of common, solvent-based plastic material between a glass substrate and the layer of recording material to produce a recording medium of substantially improved sensitivity and hole forming characteristics. This copending application further discloses the use of an additional protective layer of material over the thin recording layer. Artisans in this field have generally recognized the benefits of combining a layer of plastic material intermediate the substrate and the recording layer with a protective coating over the recording layer. However, while plastics have been suggested for use as the protective layer, in practice artisans have typically employed inorganic materials such as silicon dioxide in the protective coating, because the common solvent-based plastic materials previously suggested for use as the intermediate layer are dissolved or attacked when a protective layer of the same or similar solvent-based plastic material is attempted to be applied as the solvent utilized readily penetrates the thin layer of laser recording material.

In accordance with this invention a laser recording medium is provided in the form of mutiple layers formed on a substrate with thin layers of plastic material on both sides of a thin layer of optical energy absorbing material, i.e. the recording layer. In accordance with this invention at least the second layer of plastic material is formed on the recording layer in a vapor deposition process wherein a hot reactive monomer vapor is condensed as polymeric coating on the recording layer. The layer of plastic material intermediate the substrate and the recording layer may comprise a layer of solvent-based plastic material since its physical integrity will not be affected by the vapor deposition process used in forming the second layer of plastic material. In the alternative, the intermediate layer may also comprise a layer of plastic material formed on the substrate in the same vapor deposition process. Preferably, the polymeric coating formed as the protective layer is one of the known parylene compounds.

The use of parylene as a protective layer over a layer of optical energy absorbing material (the recording layer) results in a laser recording medium of exceptional durability and long term stability. The parylene coating is both highly durable to protect against any abrasion damage to the recording layer and resistant to moisture and/or other contaminants in the ambient environment which might otherwise cause a chemical deterioration of the recording layer. Parylene advantageously enables use of either a solvent-based plastic or another layer of parylene as the intermediate layer between a glass substrate and the recording layer. Easily applied solvent-based plastic materials such as baked and exposed photoresist material can be used as an intermediate layer without this layer or the thin metal recording layer formed thereon being adversely affected during the formation of the protective layer of parylene. Since parylene is vapor deposited and not formed in a solvent coating process the stability of the solvent-based intermediate plastic layer is not affected during the formation of the parylene layer.

Furthermore, it has been discovered that parylene itself has excellent characteristics for use as the intermediate layer. It is optically clear and bonds well to a glass substrate. It can be applied as a uniform layer with well-controlled thickness and provides a good surface for deposition of the thin metal recording layer. Parylene has low thermal conductivity to insulate the metal recording layer from the glass substrate to preserve the sensitivity of the recording layer. It also has an index of refraction sufficiently close to that of the glass substrate to preclude substantial reflection of laser beam energy at its optical interface with the glass substrate.

Other features and advantages of this invention will be apparent from the detailed description given below in conjunction with the accompanying drawings.

FIG. 4 is a block diagram of exemplary apparatus which may be utilized in forming parylene layers utilized in this invention.

FIG. 5 is a diagram of an exemplary reaction carried out in the apparatus of FIG. 4.

Figure 1:
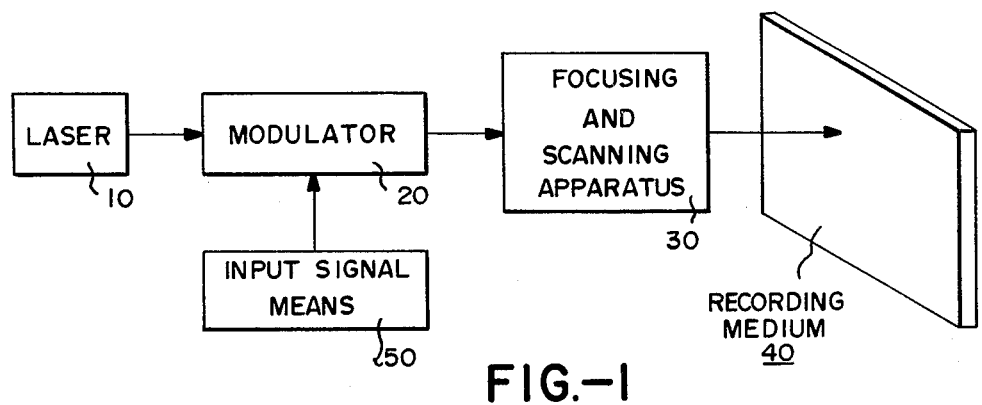
FIG. 1 is a block diagram of illustrative apparatus in a laser data recording system.

FIG. 1 illustrates the apparatus utilized in a typical laser beam recording system. This type of laser recording system is now generally well known in the art and need not be discussed in detail herein. Reference is made to the above-mentioned Becker U.S. Pat. No. 3,474,457 and Becker et al. U.S. Pat. No. 4,001,840 for a more detailed discussion of the principles of laser recording and exemplary apparatus embodying these principles. Generally, laser beam recording involves the use of a laser 10 with its output coupled to a beam modulator 20 which is driven by an input signal means 50 to produce a modulated laser beam output. In a binary data writing mode the input signals means supplies a stream of binary digits such that the modulator produces a binary amplitude modulation of the laser beam. Focusing and scanning apparatus 30 receives the modulated laser beam, focuses it to a very small spot on recording medium 40 and scans it in a predetermined pattern across recording medium 40. As the modulated laser beam strikes various sequential cell locations of the recording layer in laser recording medium 40, it burns a very small hole (0.5–1.0 microns in diameter) therein if the modulated laser beam is on at that time or leaves the recording layer undisturbed if the modulated laser beam is off. The term "burn" is typically used in the art to describe the hole formation in the recording layer even though the recording layer is actually melted or vaporized to create a hole rather than being burned in the ordinary sense of the word. Accordingly, the binary data input to the modulator 20 is reproduced on recording medium 40 as the presence or absence of a hole at each cell location in the recording medium. The bit pattern written into recording medium 40 can be later read by again scanning the recording medium with an unmodulated laser beam and detecting the presence or absence of a hole in each cell location in terms of the amount of light reflected at each cell location.

As generally discussed above, laser data recording apparatus is inherently capable of recording binary data at very high densities on the order of about $10^9$ bits per square inch. As previously noted to provide apparatus which enables a laser recording system to achieve bit densities approaching the inherent capability of the technology places heavy demands on all aspects of the laser recording system and especially the laser recording medium. Since data is recorded in the form of the presence or absence of minute holes burned into the recording layer by highly focused laser beam, the overall stability and durability of the laser recording medium both during the recording process and for a long time period thereafter is critical in determining the ultimate bit density which can be utilized and still achieve data writing and reading at low error rates over long periods of time. Stability and durability are especially critical if the laser recording system is to be utilized for archival storage of image data from documents which are thereafter destroyed.

To provide a recording medium which can be accurately and reproducibly aligned with the scanning laser beam in a laser recording system requires that the recording medium utilize a dimensionally stable inflexible substrate such as a thin glass slide of the type generally used by the semiconductor industry in forming highly accurate photomasks used in the production of large scale integrated circuits. Such glass slides form the basis for a recording medium which has excellent dimensional stability and can easily be integrated into an overall data slide handling system for reproducibly positioning the recording medium with reference to the scanning path of the laser beam. Further, it is necessary to form on the glass substrate a recording layer of material which is sensitive to optical energy of the wavelength of the laser beam in a manner which will provide overall long term stability and durability for the recording medium.

Figure 2:
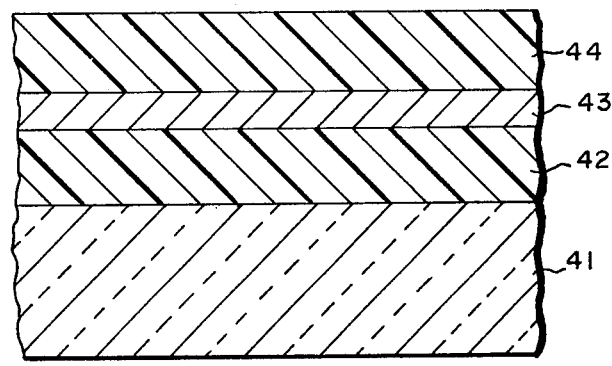
FIG. 2 is a fragmentary cross-sectional view of a laser recording medium in accordance with this invention.

FIG. 2 shows a cross-sectional view of a data recording medium 40 in accordance with a preferred embodiment of this invention. As shown, data recording medium 40 generally comprises a transparent substrate 41 preferably a rigid transparent glass slide, on which a complex of layers is formed. The glass slide may conveniently be about four inches square and about 60 mils thick. The first layer formed on substrate 41 is a uniform layer of optically clear plastic material 42. The thickness of this layer conveniently ranges between 0.05-10 microns. The second layer formed on top of the optically clear plastic layer 42 is a laser recording layer 43 which is preferably a relatively low melting point metal such as, for example, bismuth or tellurium. To achieve high sensitivity to the focused laser beam, the metal recording layer 43 is typically made very thin (e.g. 50-200 Angstroms) to minimize the amount of material required to be melted to form a hole. The next layer formed on the substrate over the thin recording layer 43 is an additional layer of plastic material 44 which may be formed to a thickness in the range of 0.05-10 microns. This top layer of plastic material provides a protective coating for the thin metal recording layer 43 to insure that it maintains its physical integrity both during physical handling of the recording medium and during the process of writing data into the recording medium with the laser beam. Preferably, the laser beam is incident on recording layer 43 through the glass substrate 41 and intermediate layer 43 since any dust particles which might accumulate on the exposed substrate surface are then out-of-focus of the laser beam during reading and writing of data in recording layer 43. It should be understood that the drawing of FIG. 2 is not to scale since it would not be possible to depict separate layers of such different thicknesses.

In accordance with this invention the protective layer of plastic material 44 is formed via a vapor deposition process in order to insure that the formation of that layer will not adversely affect either the data recording layer 43 or the previously formed intermediate layer 42. By forming layer 44 in a vapor deposition process, which can be carried out with the substrate 41, the intermediate layer 42, and the recording layer 43 substantially at room temperature, and which involves no solvents, the integrity of the recording layer 43 and the underlying intermediate plastic layer 42 is in no way affected by the formation of protective coating layer 44.

Consider first a recording medium in which the intermediate layer 42 is conveniently formed of a common, solvent-based plastic material such as, for example, a photoresist layer which has been formed on the surface of glass substrate 41. Commonly photoresist is used in the semiconductor industry for providing pattern definition at various steps in the process of forming integrated circuit topology. It has been found that photoresist has good characteristics for use as an intermediate layer in a laser recording medium.

Having formed a thin uniform layer of photoresist as the intermediate layer 42 on substrate 41, a thin metal recording layer 43 may now be formed thereon. Formation of this thin metal recording layer can be accomplished by vacuum deposition or sputtering techniques and, as previously mentioned, the layer may be as thin as 50-200 Angstroms. It will be appreciated that such a thin recording layer is highly sensitive to the integrity of the surface of the photoresist layer 42 on which it is formed. It has been discovered that attempts to form a protective layer 44 from a common solvent-based plastic material result in penetration of the solvent through the thin recording layer 43 whereupon the surface of the solvent-based photoresist (or other plastic) layer 42 to is attacked and the physical integrity of recording layer 43 is destroyed. A specific example of the results of attempts to provide a solvent-based plastic coating 44 over a recording layer formed on a solvent-based intermediate layer 42 is as follows:

A clean glass slide was coated with a negative photoresist solution supplied by KTI Chemicals Incorporated. This coating was formed by placing a small amount of the photoresist solution on the glass slide and then spinning the slide to provide a uniform coating. Thereafter the coating was baked for thirty minutes at a temperature of 180° C. The thickness of the photoresist coating was approximately 0.75 microns. The hardened coating of photoresist material was then cured by exposure to ultraviolet light for ten minutes. The coating had excellent adhesion to the glass slide when subjected to standard tests such as attaching cellophane tape to be coated surface and thereafter pulling the tape from the surface at right angles thereto. Removal of the tape without removal of the coating indicates excellent adhesion to the substrate which was achieved in this example. Thereafter a layer of tellurium was applied on top of the photoresist layer to a thickness of about 200 Angstroms. Next, a polymer material was applied over the layer of tellurium utilizing a solution having the following composition:

| Component | Parts by Weight |
|---|---|
| Cellulose Acetate Butyrate (CAB 381-20; Product of Eastman Chemicals) | 7.5 |
| Methyl Ethyl Ketone | 89.5 |
| Flow Control Agent (e.g. Union Carbide Silicones; L4500, L5310, or L6202) | 0.06 |
| Methyl Oxitol | 2.94 |

Application of the above solution resulted in a lifting of the tellurium layer off of the intermediate photoresist layer with a subsequent crumbling thereof indicating dissolution of the photoresist layer by the solvents in the solution. Because of the dissolution of the intermediate photoresist layer it was not possible to produce an integral encapsulated metal recording layer.

While attempts to form a solvent-based protective coating 44 over a recording layer 43 formed on another solvent-based intermediate layer 42 are generally unsuccessful, it has been discovered that a highly durable protective coating 44 can be provided by a vapor deposition of a material such as parylene over the recording layer 43. By utilizing a vapor deposition process instead of a solvent-based plastic coating process, no solvent or other material capable of attacking the surface of plastic layer 42 is present. Consequently, the integrity of intermediate layer 42 and the thin metal recording layer 43 is maintained.

FIG. 4 illustrates schematically the equipment employed and in the process conditions under which deposition of a polymeric plastic material such as parylene is performed. The illustrated equipment and the process carried out therein were previously developed by, and are commercially available from, Union Carbide Corporation.

FIG. 5 shows the chemical reaction undergone in the process of vapor deposition of parylene. In the example of FIG. 5 the particular parylene material is parylene N or poly-paraxylylene. Other parylene materials which can be used are parylene C or poly-monochloro-para-xylylene which has one chlorine atom on each benzene ring and parylene D or polydichloro-para-xylene which has two chlorine atoms on each benzene ring. As shown in FIG. 4 in conjunction with the reaction illustrated in FIG. 5 the parylene deposition process starts with a dimer placed in a vaporizor 100 operating with an internal temperature of about 175° C. at a pressure of about one Torr. The vaporized dimer then passes into a pyrolysis furnace 110 operating at an internal temperature of about 680° C. at a pressure of approximately 0.5 Torr. In this two-step heat process the dimer, in this case di-para-xylylene, is converted into a reactive monomer, in this case para-xylylene. This hot reactive monomer vapor then passes into a deposition chamber 120 operating at an internal temperature of about 25° C. at a pressure of 0.1 Torr. In deposition chamber 120 a uniform coating of parylene is formed on articles placed therein, in this case a partially formed recording medium comprising glass substrate 41 and intermediate plastic layer 42 and the metal recording layer 43 (FIG. 2). In accordance with relatively standard practice a cold trap 130 operating at about −70° C. and a vacuum pump 140 operating at a vacuum pressure of about 0.001 Torr are utilized to maintain the relative levels of vacuum in the vaporizor 100, pyrolysis furnace 110 and deposition chamber 120. The hot reactive monomer vapor entering the deposition chamber 120 condenses on cooler articles in deposition chamber 120; and as the vapor condenses, it polymerizes to form a very uniform plastic coating over the entire article.

Figure 3:
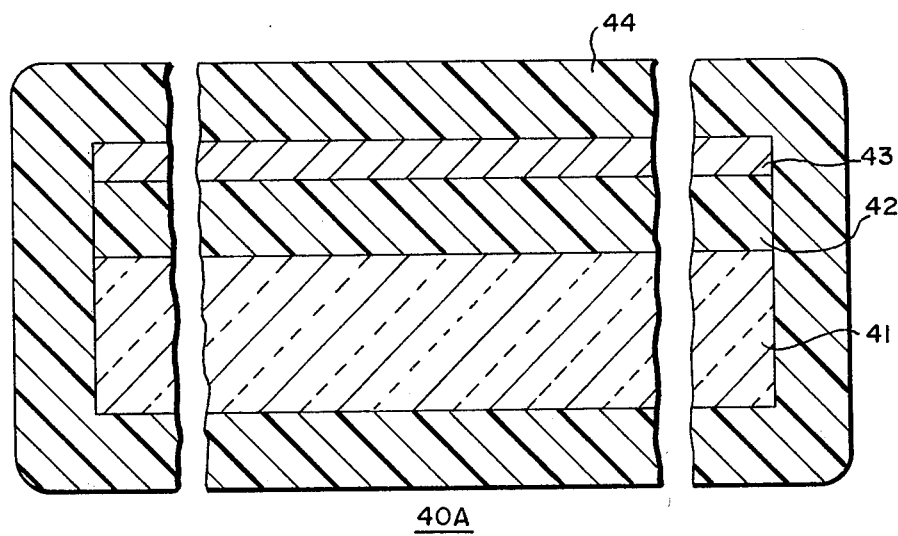
FIG. 3 is a fragmentary cross-sectional view of an alternative embodiment of a laser recording medium in accordance with this invention.

FIG. 2 shows a laser recording medium with protective plastic layer 44 only on top of recording layer 43. This can be accomplished, if desired, by masking the bottom of substrate 41 prior to depositing the parylene layer. FIG. 3 shows an alternative embodiment in which a vapor deposited plastic coating 44 is formed over the entire recording medium including the sides and bottom of substrate 41. The optical characteristics of a vapor deposited coating such as parylene are such that the use of a thin layer of vapor deposited material 44 on the bottom of substrate 41 does not substantially affect the transmission of laser beam energy into recording layer 43 in systems in which the laser beam is directed into recording layer 43 through the glass substrate. Forming the vapor deposited plastic coating around the complete laser recording medium provides a protective coat over the entire medium and may assist in assuring its long term stability.

It has also been discovered that a vapor deposited layer of plastic material such as parylene can serve as intermediate layer 42 in laser recording medium 40. Parylene has been found to have all of the characteristics desirable for use as an intermediate layer. First of all, it has a high degree of optical clarity and thus does not substantially interfere with the transmission of laser beam energy into recording layer 43. Parylene's index of refraction of approximately 1.65 provides a relatively good matched to that of a glass substrate (index of about 1.5) to minimize reflection of a laser beam at the interface therebetween. Further, parylene has a thermal conductivity much less than a glass substrate to provide good thermal insulation of a recording layer formed thereon and thus good laser writing sensitivity. Parylene adheres well to substrate 41 and provides a good surface on which to deposit a thin metal recording layer. Consequently, parylene can be utilized both as an intermediate layer 42 and a protective layer 44. In accordance with this aspect of the invention, a thin recording layer 43 is advantageously completely encased in layers of plastic materials having substantially identical properties and each formed in a relatively benign environment of the vapor deposition process described above. FIG. 3 shows a single layer of parylene 44 surrounding the glass substrate 41. This can be achieved by masking the sides and bottoms of substrate 41 during the deposition of intermediate layer 42. Alternatively, the glass substrate could be coated with two separate parylene layers during the deposition of intermediate layer 42 and protective layer 44.

The following examples are given to illustrate the present invention in greater detail but are not to be construed to limit the scope of the invention.

EXAMPLE 1

A clean glass slide was coated with a negative photoresist liquid as supplied by KTI Chemicals Incorporated. The photoresist liquid was dropped on the glass slide and the slide then spun to provide a uniform thin coating. This coating was then baked for thirty minutes at a temperature of 180° C. Thereafter the hardened coating was cured under ultraviolet light for about twenty minutes. The resulting coating had a thickness of approximately 0.75 microns. Thereafter a layer of tellurium was deposited on the photoresist surface in a vacuum deposition process. The thickness of the tellurium layer was approximately 200 Angstroms. Thereafter parylene C was deposited over the tellurium layer in the vapor deposition process described previously. The result was an integral encapsulated recording layer with no observable effect of the parylene coating on either the tellurium recording layer or the photoresist intermediate layer.

EXAMPLE 2

A clean glass slide was coated with parylene C in the vapor deposition process described above with the parylene coating being about 10 microns in thickness and being deposited on both sides of the glass slide. Thereafter a layer of tellurium about 200 Angstroms thick was applied by vacuum deposition on the surface of the parylene coated glass slide. Finally, a protective coating of parylene C was deposited over the tellurium layer to a thickness of ten microns. This resulted in an integral encapsulated recording layer with excellent characteristics and long term stability and durability.

It will be apparent to those skilled in this art that the structure of this invention could be adapted to form more complex recording medium involving one or more additional recording layers. Furthermore, the invention is readily adaptable to recording media structures in which a reflecting layer (not shown) is formed on top of the protective layer 44 shown in FIG. 2 with the thickness of the protective layer being established in conjunction with the optical characteristics of the reflecting layer to maximize the reflection of laser beam energy transmitted through recording layer 43 back to recording layer 43, thereby to further enhance the sensitivity of the recording medium.

What is claimed is:

1. A laser recording medium comprising: a transparent substrate; a layer of plastic material formed directly on said substrate; a layer of optical energy absorbing material formed on said layer of plastic material; a second layer of plastic material formed on said layer of energy absorbing material in a vapor deposition process wherein a hot reactive monomer vapor is condensed as a polymeric coating on said layer of optical energy absorbing material without substantially affecting the physical integrity of said layer of optical energy absorbing material or the layer of plastic material thereunder, said second layer of plastic material being formed over all surfaces of said laser recording medium.

2. A laser recording medium as claimed in claim 1 wherein said first recited layer of plastic material comprises a layer of solvent-based plastic material.

3. A laser recording medium as claimed in claim 1 wherein said first recited layer of plastic material is also formed in a vapor deposition process wherein a hot reactive monomer vapor is condensed as a polymeric coating on said substrate.

4. A laser recording medium as claimed in claims 1, 2, or 3 wherein said second uniform layer of plastic material comprises a vapor deposited parylene material.

* * * * *